United States Patent [19]
Yamada

[11] Patent Number: 6,122,445
[45] Date of Patent: Sep. 19, 2000

[54] METHOD OF CONTROLLING A POSITION OF A BUILT-IN CAMERA IN A DATA PROCESSING MACHINE AND APPARATUS FOR DOING THE SAME

[75] Inventor: Tadashi Yamada, Tokyo, Japan

[73] Assignee: NEC Corporation, Tokyo, Japan

[21] Appl. No.: 09/192,328

[22] Filed: Nov. 16, 1998

[30] Foreign Application Priority Data

Nov. 14, 1997 [JP] Japan .................................. 9-313343

[51] Int. Cl.⁷ ........................... G03B 15/00; G03B 17/00
[52] U.S. Cl. .................................. 396/2; 396/427; 396/58
[58] Field of Search .............................. 396/2, 58, 427, 396/428, 429

[56] References Cited

U.S. PATENT DOCUMENTS 5,373,319  12/1994  Lee ........................................... 348/143

FOREIGN PATENT DOCUMENTS

| 60-139998 | 7/1985 | Japan . |
| 62-140563 | 6/1987 | Japan . |
| 1-263703 | 10/1989 | Japan . |
| 3-130729 | 6/1991 | Japan . |
| 3-130737 | 6/1991 | Japan . |
| 3-130738 | 6/1991 | Japan . |
| 3-130742 | 6/1991 | Japan . |
| 3-130743 | 6/1991 | Japan . |
| 4-213442 | 8/1992 | Japan . |
| 4-265960 | 9/1992 | Japan . |
| 4-268542 | 9/1992 | Japan . |
| 4-318828 | 11/1992 | Japan . |
| 4-320228 | 11/1992 | Japan . |
| 5-176215 | 7/1993 | Japan . |
| 7-199281 | 8/1995 | Japan . |
| 7-209700 | 8/1995 | Japan . |
| 8-56295 | 2/1996 | Japan . |

*Primary Examiner*—David M. Gray
*Attorney, Agent, or Firm*—Foley & Lardner

[57] ABSTRACT

A built-in camera installed in an equipment for taking a photograph of a desired portion of an object to be photographed is positioned by (i) preparing a sensor which transmits a detection signal when it detects the object to be photographed, (ii) defining, when the detection signal varies by a predetermined value or greater, a certain portion of the object situated along the sensor axis as a particular portion of the object, (iii) determining in advance the desired portion of the object to be photographed relative to the particular portion of the object, (iv) fixing an optical axis of the built-in camera relative to the sensor axis in such a manner that the optical axis of the built-in camera is directed toward the desired portion of the object when the sensor axis is directed toward the particular portion of the object, (v) changing an orientation of the sensor axis toward the particular portion of the object, and (vi) causing the built-in camera to take a photograph of the object when the detection signal indicates that the sensor axis is directed toward the particular portion of the object.

71 Claims, 5 Drawing Sheets

METHOD OF CONTROLLING A POSITION OF A BUILT-IN CAMERA IN A DATA PROCESSING MACHINE AND APPARATUS FOR DOING THE SAME

BACKGROUND OF THE INVENTION

1. Field of the Invention

The invention relates to a method and an apparatus for controlling a position of a built-in camera installed in an equipment, such as a monitoring camera, for the purpose of appropriately taking a photograph of an object, and more particularly to a method of automatically controlling a position of a built-in camera, and an apparatus for implementing the method.

2. Description of the Related Art

A monitoring system using a camera for photographing a particular portion of an object located at a predetermined location has been disclosed in Japanese Unexamined Patent Publication No. 62-140563.

Figure 1:
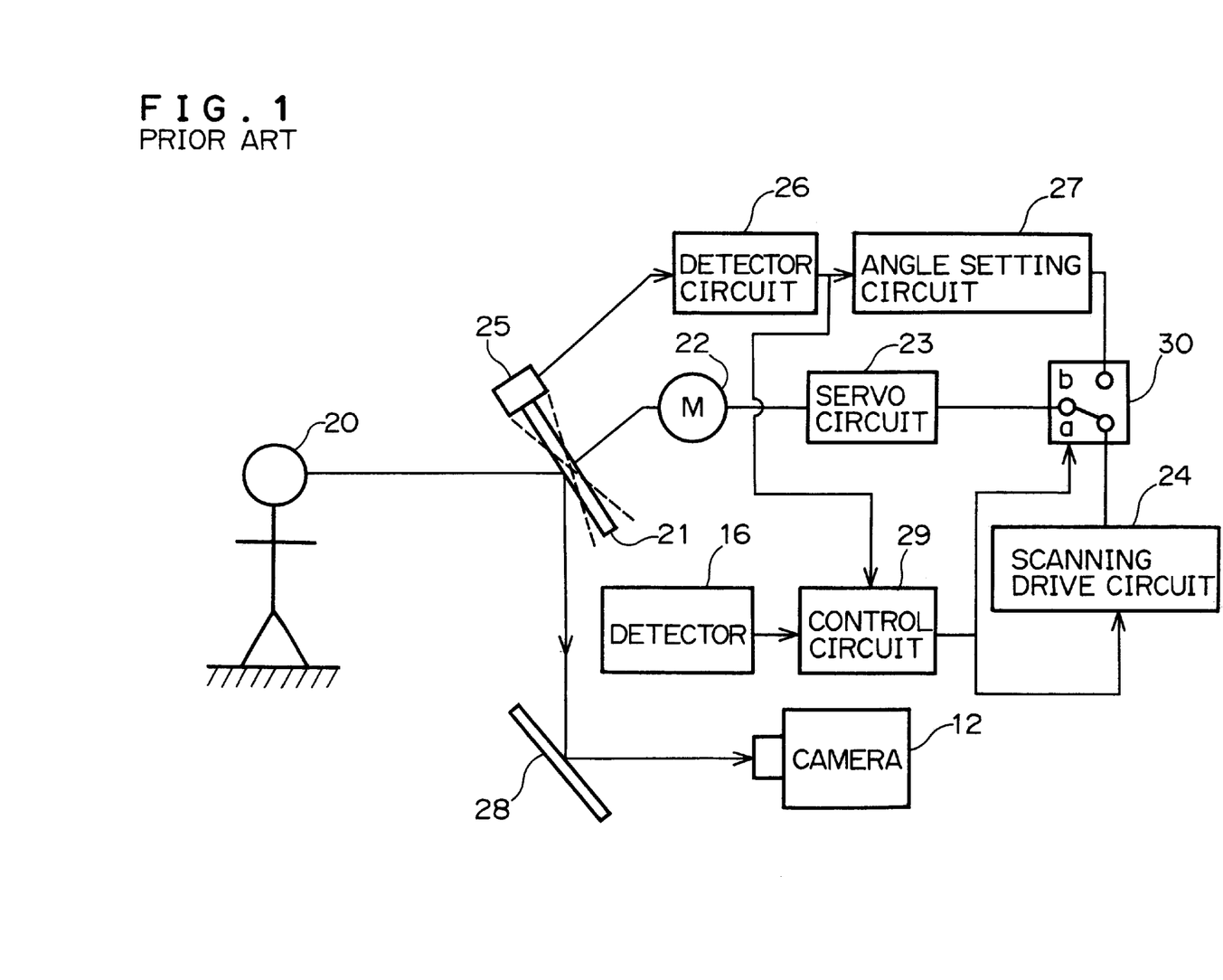
FIG. 1 is a block diagram of a conventional monitor system.

FIG. 1 is a block diagram illustrating the major parts of the monitoring system described in the Publication.

When a detector 16 detects that there is a person standing in front of a main unit of an automatic cash dispenser, a control circuit 29 actuates a switch 30 in such a manner that a scanning drive circuit 24 is electrically connected to a servo circuit 23. At the same time, the scanning drive circuit 24 is activated by the control circuit 29. The servo circuit 23 drives a motor 22 in synchronization with output signals transmitted from the scanning drive circuit 24.

A mirror 21 is rotated by the motor 22. The mirror 21 is provided with a detector 25. When the detector 25 is above a face 20 of the person standing in front of the cash dispenser, the detector 25 transmits an increasing output signal as the detector 25 approaches the face 20. In a range where a distance between the detector 25 and the face 20 remains substantially constant, the detector 25 transmits an approximately constant output signal. As the detector 25 is spaced away from the face 20, the output signal decreases gradually.

The detector 25 transmits an output signal to an angle setting circuit 27 through a detector circuit 26. The angle setting circuit 27 computes such an angle of inclination of the mirror 21 that an image of the face 20 is projected exactly onto a picture-taking plane of a camera 12 through the mirror 21 and a fixed mirror 28, on the basis of the output signals transmitted from the detector 25. As a result, the mirror 21 is inclined by an appropriate angle to thereby ensure that a photograph of the face can be surely taken.

The monitoring system disclosed in the above-mentioned Publication thus ensures that a predetermined portion of a person, such as a face thereof, can be photographed reliably in dependence on a height of the person, even though people have different heights.

However, the above-mentioned monitoring system has problems as follows.

A first problem of the aforementioned conventional monitor system is that since the monitor system is not provided with a function of changing a position of the monitor camera 12, it is impossible to directly change the viewing angle of the monitor camera 12. Consequently, mirrors such as the mirror 21 and the fixed mirror 28 have to be used, resulting in that the monitor system cannot avoid having a complicated structure.

A second problem of the monitor system is that the camera 12 cannot directly take a photograph of an object, because the camera 12 is fixed, and thus, has to adjust an angle of the mirror 21 to thereby take a photograph of an object which is reflected in the mirror 21. The use of the movable mirror 21 causes a problem that an optical system required for the monitor system cannot avoid having a complicated structure, and has to have a high accuracy.

A third problem concerned with the monitor system is that complicated computation which would take much time is necessary to be conducted before taking a photograph of an object, because the camera 12 has to be scanned to detect a position of the object, followed by computation of the position, and then, the mirror 21 is driven by a computed angle. Furthermore, high accuracy is required for controlling an optical system, and there has to be conducted a complicated control for driving the mirror 21.

A fourth problem of the monitor system is as follows. The camera 12 has to be scanned again to adjust an orientation of the camera 12 so that the camera 12 is directed toward a detected position of an object. Hence, if a direction in which the camera 12 can take a photograph most suitably varies, the camera 12 has to be adjusted quickly to follow such a varying direction. However, such adjustment is quite difficult or almost impossible.

SUMMARY OF THE INVENTION

It is an object of the present invention to provide a method of controlling a position of a built-in camera, which method does not need a wide angle lens and a high-performance camera, and can be implemented by means of an apparatus having a simple structure and with less data to be processed.

It is also an object of the present invention to provide an apparatus for implementing the above-mentioned method, and a recording medium for causing a computer to implement the above-mentioned method.

In one aspect of the present invention, there is provided a method of controlling a position of a built-in camera installed in an equipment for taking a photograph of a desired portion of an object to be photographed, including the steps of (a) preparing a sensor which transmits a detection signal when it detects an object to be photographed, (b) defining, when the detection signal varies by a predetermined value or greater in an orientation of a sensor axis, a certain portion of the object situated in the orientation of a sensor axis as a particular portion of the object, an orientation of a sensor axis being defined as an orientation of a sensor detecting an object at a maximum sensitivity, (c) determining in advance a desired portion of the object to be photographed, on the basis of the particular portion of the object, (d) fixing an optical axis of the built-in camera relative to the sensor axis in such a manner that the optical axis of the built-in camera is directed toward the desired portion of the object when the sensor axis is directed toward the particular portion of the object, and (e) changing an orientation of the sensor axis toward the particular portion of the object, and causing the built-in camera to take a photograph of the object when the detection signal indicates that the sensor axis is directed to the particular portion of the object.

It is preferable that an orientation of the sensor axis is changed toward the particular portion of the object in the step (e) after it has been detected that the object was situated at a predetermined location.

It is preferable that the particular portion of the object is an end of the object. This is because what can be most readily detected among portions of an object is an end of the object. An end defines a boundary between an object to be photographed and a space around the object. Hence, when a sensor moves from a space around an object to be photographed towards the object, a detection signal transmitted from the sensor would suddenly change at the boundary. Accordingly, an end of an object can be detected most readily.

As an alternative, the particular portion of the object may be a top of a head of the object, and the desired portion of the object may be a face of the object.

Normally, human being is about 140 cm to 200 cm high. A difference in height of human beings is about 60 cm. However, a distance from a top of a head to a face is almost the same in all human beings, even if hair styles and whether he or she puts a hat on are taken into consideration. Consequently, it would be possible to take a photograph of a face of an object to be photographed regardless of his or her height, by detecting a top of a head by means of a sensor, and keeping a location of a face, which is determined based on a top of a head, within a range where a built-in camera can take a photograph.

The method is suitably applied to an equipment such as a cash processing machine including a cash dispenser.

It is preferable that the sensor is integral with the built-in camera as a one-piece unit in such a manner that the sensor is inclined relative to the built-in camera by a predetermined degree. For instance, the sensor may be mounted on the built-in camera. It is preferable that the optical axis of the built-in camera is downwardly directed relative to the sensor. It is preferable that the sensor and the built-in camera are directed from downward to upward.

There is further provided a method of controlling a position of a built-in camera installed in an equipment for taking a photograph of a desired portion of an object to be photographed, including the steps of (a) preparing a sensor which transmits a detection signal when it detects an object to be photographed, (b) defining, when the detection signal varies by a predetermined value or greater in an orientation of a sensor axis, a certain portion of the object situated in the orientation of a sensor axis as a particular portion of the object, an orientation of a sensor axis being defined as an orientation of a sensor detecting an object at a maximum sensitivity, (c) determining in advance a desired portion of the object to be photographed, on the basis of the particular portion of the object, (d) fixing an optical axis of the built-in camera relative to the sensor axis in such a manner that the optical axis of the built-in camera is directed toward the desired portion of the object when the sensor axis is directed toward the particular portion of the object, and (e) changing an orientation of the sensor axis toward the particular portion of the object in both vertical and horizontal planes, and causing the builtin camera to take a photograph of the object when the detection signal indicates that the sensor axis is directed to the particular portion of the object.

There is still further provided a method of controlling a position of a built-in camera installed in an equipment for taking a photograph of a desired portion of an object to be photographed, including the steps of (a) detecting that an object approaches an equipment, by means of a sensor, (b) identifying parts of the object to be photographed, on the basis of output signals transmitted from the sensor, (c) upwardly directing both the sensor and the built-in camera until the sensor fails to detect the object, (d) stopping moving both the sensor and the built-in camera when an output signal of the sensor varies, and (e) taking a photograph of the object.

It is preferable that the built-in camera is horizontally directed at an initial stage. For instance, a photograph is taken in the step (e) to a face of the object.

It is preferable that the method further includes the steps of (f) downwardly directing both the sensor and the built-in camera until an output signal of the sensor varies, and (g) taking a photograph of the object. It is also preferable that the method further includes the step of repeating the steps (c) to (g).

In another aspect of the present invention, there is provided an apparatus of controlling a position of a built-in camera installed in an equipment for taking a photograph of a desired portion of an object to be photographed, including (a) a sensor which transmits a detection signal when it detects an object to be photographed, and which has a sensor axis, (b) a built-in camera for taking a photograph of a desired portion of the object, the desired portion being defined as a certain portion positioned at a predetermined location on the basis of a particular portion of the object which is defined as a portion of the object situated in an orientation of the sensor axis at which the detection signal varies by a predetermined value or greater, an orientation of a sensor axis being defined as an orientation of a sensor detecting an object at a maximum sensitivity, the built-in camera having an optical axis fixed relative to the sensor axis in such a manner that the optical axis of the built-in camera is directed toward the desired portion of the object when the sensor axis is directed toward the particular portion of the object, (c) a mover for moving both the sensor and the built-in camera, and (d) a controller for controlling the mover to cause an orientation of the sensor axis to direct toward the particular portion of the object, and for causing the built-in camera to take a photograph when the detection signal indicates that the sensor axis is directed to the particular portion of the object.

For instance, controller may include (a) a first detector for computing the detection signal transmitted from the sensor to thereby detect a location of the object, (b) a mode selector for putting the apparatus into a stand-by mode when the object reaches a predetermined location, (c) a second detector for detecting whether the object starts manipulating the apparatus, and (d) a built-in camera controller for driving the mover so that the sensor axis is directed toward the particular portion of the object, when the second detector detects that the object starts manipulating the apparatus, and causing the built-in camera to take a photograph when the sensor axis is directed toward the particular portion of the object.

It is preferable that when the apparatus has a length in a horizontal direction, the apparatus further includes a mover for moving both the sensor and the built-in camera along the length of the apparatus.

There is further provided an apparatus of controlling a position of a built-in camera installed in an equipment for taking a photograph of a desired portion of an object to be photographed, including (a) a first sensor which transmits a first detection signal when it detects an object to be photographed, and which has a first sensor axis, (b) a second sensor which transmits a second detection signal when it detects an object to be photographed, and which has a second sensor axis, (c) a built-in camera for taking photographs of first and second desired portions of the object, the first and second desired portions being defined as certain portions positioned at predetermined locations on the basis of first and second particular portions of the object which are defined as portions of the object situated in orientations of the first and second sensor axes at which the first and second detection signals vary by a predetermined value or greater, an orientation of the first or second sensor axis being defined as an orientation of the first or second sensor detecting an object at a maximum sensitivity, the built-in camera having an optical axis fixed relative to the first and second sensor axes in such a manner that the optical axis of the built-in camera is directed in turn toward the first and second desired portions of the object when the first and second sensor axes are directed toward the first and second particular portions of the object, (d) a mover for rotating both the sensor and the built-in camera in a first plane including therein both the optical axis of the built-in camera and the first sensor axis, or in a second plane including therein both the optical axis of the built-in camera and the second sensor axis, and (e) a controller for controlling the mover to cause orientations of the first and second sensor axes to direct toward the first and second particular portions of the object, and for causing the built-in camera to take photographs when the first and second detection signals indicate that the first and second sensor axes are directed to the first and second particular portions of the object.

The controller may further include (a) a first detector for computing the first and second detection signals transmitted from the first and second sensors to thereby detect a location of the object, (b) a mode selector for putting the apparatus into a stand-by mode when the object reaches a predetermined location, (c) a second detector for detecting whether the object starts manipulating the apparatus, and (d) a built-in camera controller for driving the mover so that the first and second sensor axes are directed toward the first and second particular portions of the object, when the second detector detects that the object starts manipulating the apparatus, and causing the built-in camera to take photographs when the first and second sensor axes are directed toward the first and second particular portions of the object.

For instance, the first and second particular portions of the object may be a top of a head of the object, the first desired portion of the object is a front face of the object, and the second desired portion of the object may be a side face of the object.

It is preferable that the first and second sensors are integral with the built-in camera as a one-piece unit in such a manner that the first and second sensors are inclined relative to the built-in camera by a predetermined degree.

It is preferable that first and second sensors are mounted on the builtin camera. It is also preferable that an optical axis of the built-in camera is downwardly directed relative to the first and second sensors.

It is preferable that the first and second planes are perpendicular with each other, in which case, the first plane may be a vertical plane, and the second plane may be a horizontal plane.

It is preferable that the apparatus further includes a mover for moving both the first and second sensors and the built-in camera along a length of the apparatus in a horizontal direction.

There is still further provided an apparatus of controlling a position of a built-in camera installed in an equipment for taking a photograph of a desired portion of an object to be photographed, including (a) N sensors each of which transmits a detection signal when it detects an object to be photographed, and which has a sensor axis, the N being an integer equal to or greater than 3, (b) a built-in camera for taking photographs of N desired portions of the object, the N desired portions being defined as certain portions positioned at predetermined locations on the basis of N particular portions of the object which are defined as portions of the object situated in orientations of sensor axes of the N sensors at which the detection signal varies by a predetermined value or greater, an orientation of the sensor axis being defined as an orientation of a sensor detecting an object at a maximum sensitivity, the built-in camera having an optical axis fixed relative to the sensor axes in such a manner that the optical axis of the built-in camera is directed in turn toward the N desired portions of the object when the sensor axes are directed toward the N particular portions of the object, (c) a mover for rotating both the sensor and the built-in camera in N planes each including therein both the optical axis of the built-in camera and a sensor axis of one of the N sensors, and (d) a controller for controlling the mover to cause orientations of the sensor axes to direct toward the N particular portions of the object, and for causing the built-in camera to take photographs when the detection signal indicates that the sensor axes are directed to the N particular portions of the object.

In still another aspect of the present invention, there is provided a recording medium readable by a computer, storing a program therein for causing a computer to operate an apparatus of controlling a position of a built-in camera installed in an equipment for taking a photograph of a desired portion of an object to be photographed, the apparatus including (a) a sensor which transmits a detection signal when it detects an object to be photographed, and which has a sensor axis, (b) a built-in camera for taking a photograph of a desired portion of the object, the desired portion being defined as a certain portion positioned at a predetermined location on the basis of a particular portion of the object which is defined as a portion of the object situated in an orientation of the sensor axis at which the detection signal varies by a predetermined value or greater, an orientation of a sensor axis being defined as an orientation of a sensor detecting an object at a maximum sensitivity, the built-in camera having an optical axis fixed relative to the sensor axis in such a manner that the optical axis of the built-in camera is directed toward the desired portion of the object when the sensor axis is directed toward the particular portion of the object, and (c) a mover for moving both the sensor and the built-in camera, the program causing the apparatus to (a) compute the detection signal transmitted from the sensor to thereby detect a location of the object, (b) put the apparatus into a stand-by mode when the object reaches a predetermined location, (c) detect whether the object starts manipulating the apparatus, and (d) drive the mover so that the sensor axis is directed toward the particular portion of the object, when the second detector detects that the object starts manipulating the apparatus, and cause the built-in camera to take a photograph when the sensor axis is directed toward the particular portion of the object.

There is further provided a recording medium readable by a computer, storing a program therein for causing a computer to operate an apparatus of controlling a position of a built-in camera installed in an equipment for taking a photograph of a desired portion of an object to be photographed, the apparatus including (a) a first sensor which transmits a first detection signal when it detects an object to be photographed, and which has a first sensor axis, (b) a second sensor which transmits a second detection signal when it detects an object to be photographed, and which has a second sensor axis, (c) a built-in camera for taking photographs of first and second desired portions of the object, the first and second desired portions being defined as certain portions positioned at predetermined locations on the basis of first and second particular portions of the object which are defined as portions of the object situated in orientations of the first and second sensor axes at which the first and second detection signals vary by a predetermined value or greater, an orientation of the first or second sensor axis being defined as an orientation of the first or second sensor detecting an object at a maximum sensitivity, the built-in camera having an optical axis fixed relative to the first and second sensor axes in such a manner that the optical axis of the built-in camera is directed in turn toward the first and second desired portions of the object when the first and second sensor axes are directed toward the first and second particular portions of the object, and (d) a mover for rotating both the sensor and the built-in camera in a first plane including therein both the optical axis of the built-in camera and the first sensor axis, or in a second plane including therein both the optical axis of the built-in camera and the second sensor axis, the program causing the apparatus to (a) compute the first and second detection signals transmitted from the first and second sensors to thereby detect a location of the object, (b) put the apparatus into a stand-by mode when the object reaches a predetermined location, (c) detect whether the object starts manipulating the apparatus, and (d) drive the mover so that the first and second sensor axes are directed toward the first and second particular portions of the object, when the second detector detects that the object starts manipulating the apparatus, and cause the built-in camera to take photographs when the first and second sensor axes are directed toward the first and second particular portions of the object.

When the apparatus has a length in a horizontal direction, and includes a mover for moving both the sensor and the built-in camera along the length of the apparatus, it is preferable that the program further causes the apparatus to move both the sensor and the built-in camera along the length of the apparatus so that the built-in camera faces the object.

There is still further provided a recording medium readable by a computer, storing a program therein for causing a computer to operate an apparatus of controlling a position of a built-in camera installed in an equipment for taking a photograph of a desired portion of an object to be photographed, the apparatus including (a) N sensors each of which transmits a detection signal when it detects an object to be photographed, and which has a sensor axis, the N being an integer equal to or greater than 3, (b) a built-in camera for taking photographs of N desired portions of the object, the N desired portions being defined as certain portions positioned at predetermined locations on the basis of N particular portions of the object which are defined as portions of the object situated in orientations of sensor axes of the N sensors at which the detection signal varies by a predetermined value or greater, an orientation of the sensor axis being defined as an orientation of a sensor detecting an object at a maximum sensitivity, the built-in camera having an optical axis fixed relative to the sensor axes in such a manner that the optical axis of the built-in camera is directed in turn toward the N desired portions of the object when the sensor axes are directed toward the N particular portions of the object, and (c) a mover for rotating both the sensor and the built-in camera in N planes each including therein both the optical axis of the built-in camera and a sensor axis of one of the N sensors, the program causing the apparatus to (a) compute the detection signal transmitted from the N sensors to thereby detect a location of the object, (b) put the apparatus into a stand-by mode when the object reaches a predetermined location, (c) detect whether the object starts manipulating the apparatus, and (d) drive the mover so that the sensor axes are directed toward the N particular portions of the object, when the second detector detects that the object starts manipulating the apparatus, and causing the built-in camera to take photographs when the sensor axes are directed toward the N particular portions of the object.

An operation of the present invention is briefly explained hereinbelow with respect to the above-mentioned apparatus as an example.

When a user, that is, an object to be photographed, approaches the apparatus to manipulate it, the sensor detects a distance to the object. When the controller receives a signal from the sensor to indicate that a user is approaching the apparatus, the controller activates movable portions of the apparatus.

The apparatus includes only one sensor. However, it should be noted that the apparatus may include a plurality of sensors for enhancing accuracy of taking photographs and mobility of a camera. One of the most important features of the present invention is that one sensor sufficiently operates the apparatus.

The sensor is tilted at a predetermined angle to a direction in which a camera will take a photograph, and is fixed onto the camera so that the sensor moves together with the camera. The sensor detects a position of and a distance to a face, which is a portion of the object to be photographed.

The controller computes an orientation of the sensor axis based on detection signals transmitted from the sensor, and judges whether a sensor axis directs to a particular portion of an object. The controller drives the mover to thereby move a built-in camera in accordance with the computation, and causes the built-in camera to accurately take a photograph of a face of an object.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

In the specification, an orientation of a camera means an orientation of an optical axis of a built-in camera. An orientation of a sensor is an orientation in which the sensor detects an object with maximum sensitivity, that is, an orientation of a sensor axis.

First Embodiment

Figure 2:
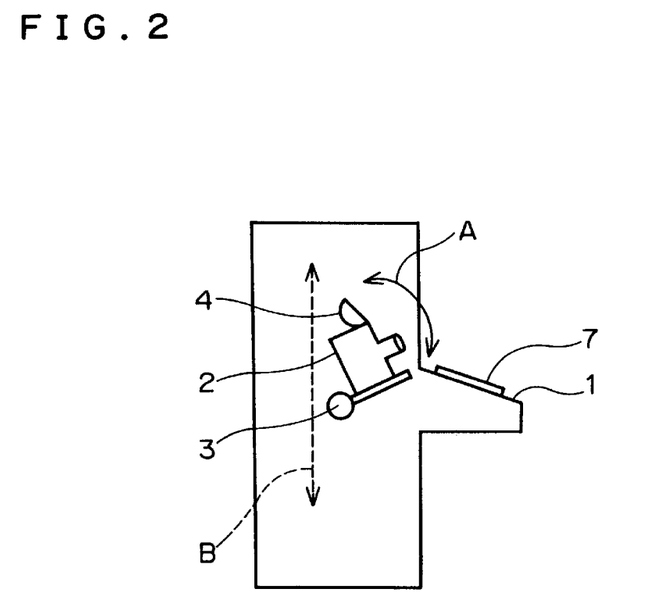
FIG. 2 is a cross-sectional view of an apparatus in accordance with the first embodiment of the present invention.

FIG. 2 illustrates an apparatus of controlling a position of a built-in camera installed in a cash processing machine for taking a photograph of a desired portion of an object to be photographed, in accordance with the first embodiment. The apparatus controls a position of a built-in camera to thereby keep a predetermined portion, for instance, a face of a user approaching and manipulating the cash processing machine, nearly in the center of a built-in camera's field of view.

As illustrated in FIG. 2, the apparatus in accordance with the first embodiment is installed in a cash processing machine 1 such as a cash dispenser. The cash processing machine 1 includes a manipulation board 7 and other various input/output devices (not illustrated). The apparatus in accordance with the first embodiment is comprised of a built-in camera 2, a sensor 4 mounted on the builtin camera 3 and having a sensor axis upwardly inclined by a predetermined angle relative to an optical axis of the built-in camera 2, and a mover 3 for moving both the built-in camera 2 and the sensor 4.

The reason why the sensor 4 is upwardly inclined relative to the built-in camera 2 is that the built-in camera 2 which is slightly downwardly inclined relative to the sensor 4 can catch a face of a user within its field of view, when the sensor 4 cannot detect a user.

In the embodiment, the built-in camera 2 is comprised of a small-sized video camera. A face of a user, who is a person manipulating the cash processing machine 1, is photographed by the built-in camera 2. A picture taken by the built-in camera 2 is used for the purpose of reference of a character, establishment of a database, and reproduction of record in the case that a crime occurs.

The mover 3 makes rotational movement in clockwise and counterclockwise directions indicated with an arrow A. Hence, the built-in camera 2 and the sensor 4 also make rotational movement along the arrow A. The mover 3 is comprised of a servo motor, for instance.

Though the mover 3 is designed to make rotational movement along the arrow A in the first embodiment, it should be noted that the mover may be designed to vertically raise and lower in a direction indicated with a broken line arrow B.

The sensor 4 detects a position of an object that is approaching, that is, a distance between the object and the sensor 4. The sensor 4 may be comprised of an optical sensor, an ultrasonic sensor, or an infrared sensor. The sensor 4 is fixed onto the built-in camera 2 at a predetermined angle relative to a direction in which the built-in camera 2 takes a photograph, or a direction of an optical axis of the built-in camera 2, and is made to rotate by the mover 3 together with the built-in camera 2.

Figure 3:
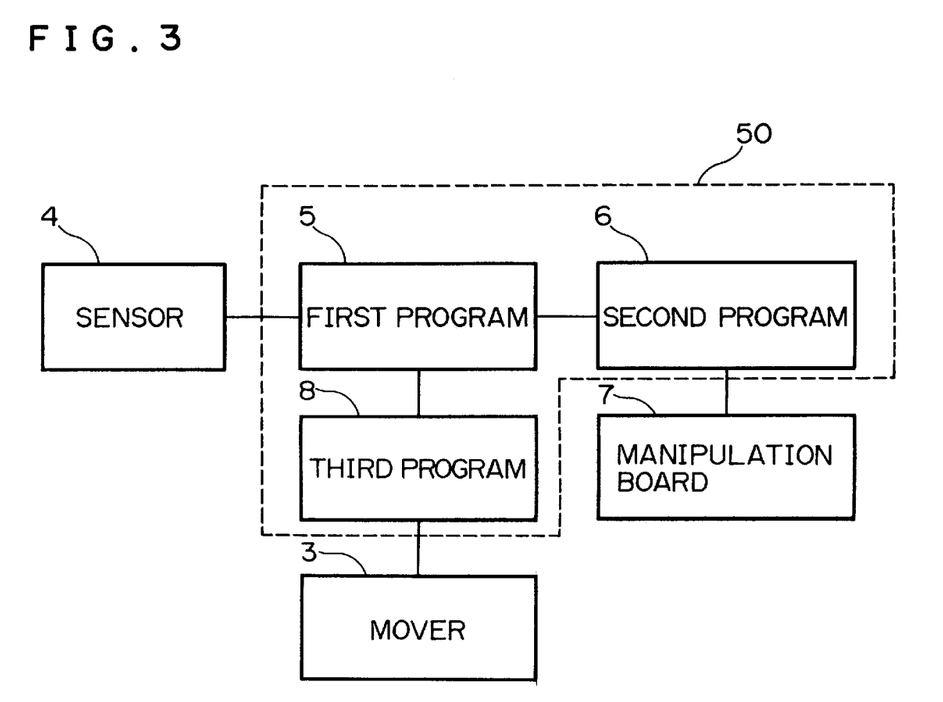
FIG. 3 is a block diagram of a controller which is a part of the apparatus illustrated FIG. 2.

FIG. 3 is a block diagram of a controller 50 for controlling the mover 3. The controller 50 is comprised of a central processing unit (CPU), for instance, and includes a first program 5 as a first detector for computing detection signals transmitted from the sensor 4 to thereby detect a location of an object, a second program 6 as a mode selector for putting the apparatus into a stand-by mode when an object reaches a predetermined location, and a third program 8 as a built-in camera controller for driving the mover 3 so that a sensor axis of the sensor 4 is directed toward a particular portion of an object, when the manipulation board 7 as a second detector detects that an object starts manipulating the apparatus, and causing the built-in camera 2 to take a photograph when the sensor axis is directed toward the particular portion of the object.

When a user or an object to be photographed approaches the manipulation board 7, the sensor 4 outputs a detection signal indicative of an position of the object. The first program 5 computes the detection signals transmitted from the sensor 4 to thereby detect a position of the object. When the object to be photographed is detected to be approaching the cash processing machine 1, the second program 6 puts the manipulation board 7 into a stand-by mode. Herein, a stand-by mode is a mode where the cash processing machine 1 waits for a user to manipulate the cash processing machine 1 through the manipulation board 7.

When the manipulation board 7 confirms that a user has manipulated the cash processing machine 1 through the manipulation board 7, the third program 8 determines a portion of a user to be photographed, based on an output signal transmitted from the first program 5, and drives the mover 3 until the sensor 4 detects a desired portion to be photographed. The mover 3 moves or rotates the built-in camera 2 in clockwise and counterclockwise directions along the arrow A under the control of the third program 8. In other words, the third program 8 drives the mover 3 to thereby rotate the built-in camera 2 and the sensor 4 until the first program 5 transmits to the third program 8 a signal indicating that the built-in camera 2 has just caught a face of a user within its field of view.

An operation of the first embodiment is described hereinbelow. When a user approaches the manipulation board 7, the sensor 4 generates and transmits a detection signal indicative of a location of the user, to the controller 50. On receipt of the detection signal, the first program 5 of the controller 50 detects that the user approaches the manipulation board 7, and further transmits a detection signal to the second program 6.

Receiving the detection signal transmitted from the first program 5, the second program 6 put the apparatus into a stand-by mode.

When it has been confirmed that the user had operated the manipulation board 7, the third program 7 decides a portion of the user to be photographed, on the basis of the detection signals transmitted from the sensor 4. The decision is implemented as follows.

If the detection signal transmitted from the sensor 4 is not varied at all when the third program 8 controls the mover 3 to thereby rotate the built-in camera 2, this means that the sensor 4 is detecting a portion of an user. The third program 8 controls the mover 3 to thereby rotate the built-in camera 2 in a counterclockwise direction until the sensor 4 can no longer detect an user.

The sensor 4 has detected an end of an user immediately before the sensor 4 could not detect an user. Since the built-in camera 2 is fixed onto the sensor 4 so that an optical axis of the built-in camera 2 is set at a predetermined angle relative to the sensor 4, the built-in camera 2 has actually caught a portion of an user associated with the end of an user detected by the sensor 4, in its field of view, when the sensor 4 detects the end of an user. Thus, a desired portion of the user can be caught in a field of view of the built-in camera 2.

In the present embodiment, a field of view of the built-in camera 2 moves towards an upper portion of an user, as the built-in camera 2 and the sensor 4 are rotated in a counterclockwise direction by the mover 3. When the detection signal transmitted from the sensor 4 varies in a magnitude, it means that the sensor 4 has been rotated upwardly to an angle at which an user cannot be detected by the sensor 4.

Since the built-in camera 2 is mounted on the mover 3 in such a manner that an optical axis of the built-in camera 2 is slightly downwardly directed relative to a sensor axis of the sensor 4, when the detection signal transmitted from the sensor 4 varies, the built-in camera 2 catches a face of a user to be photographed, nearly at the center of a field of view thereof. At this moment, the third program 8 stops driving the mover 3 to thereby stop the built-in camera 2 at that position, and then, causes the built-in camera 2 to take a photograph of a face of an user.

Then, a decision is made as to whether control for movement of the built-in camera 2 should be stopped. If the control is to be continued, the built-in camera 2 is rotated in a clockwise direction, and again, the detection signal transmitted from the sensor 4 is checked.

When the detection signal varies, the built-in camera 2 is rotated to a point beyond which the sensor 4 cannot detect a user. By repeating these steps, a face of an user can be kept nearly at the center of a field of view of the built-in camera 2.

Figure 4:
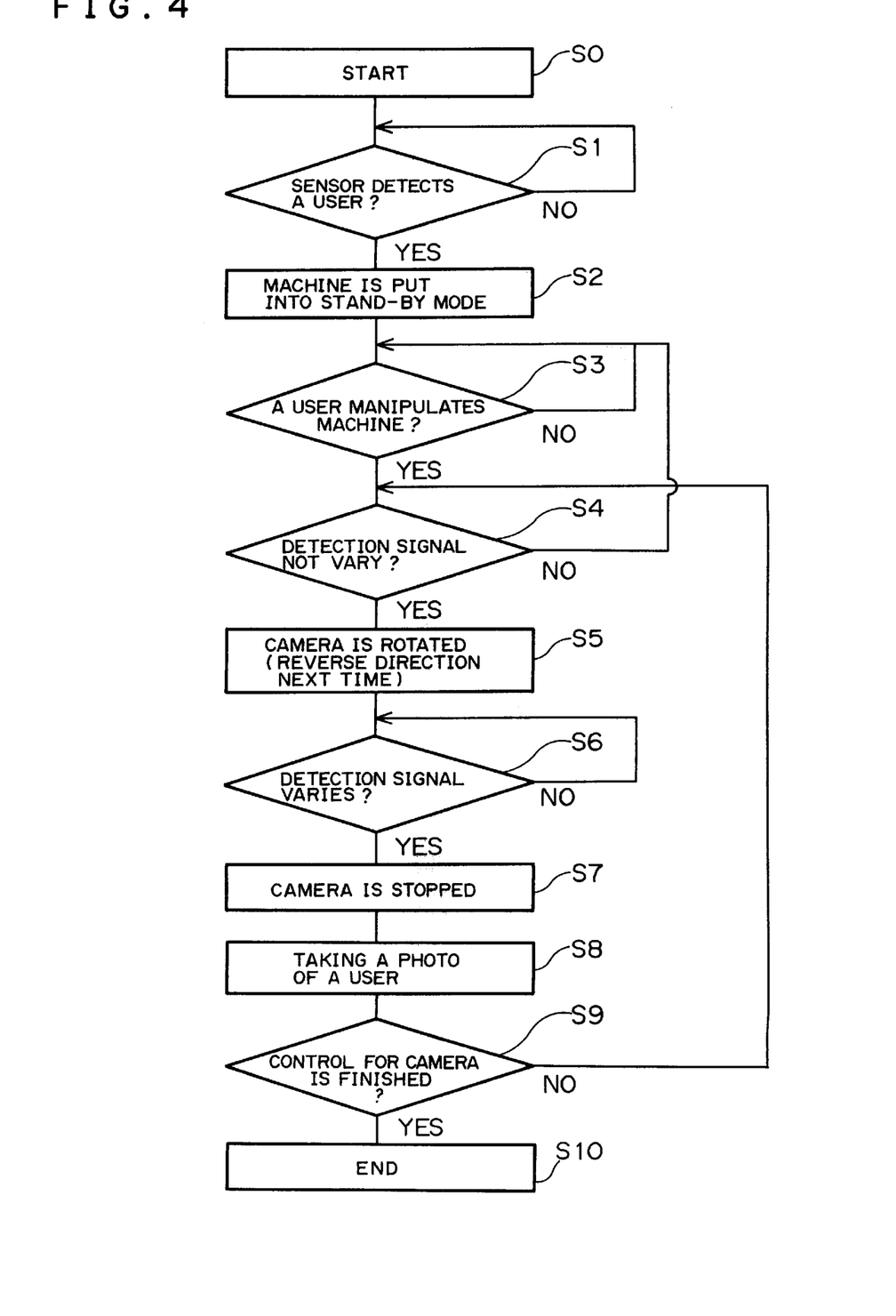
FIG. 4 is a flow chart of an operation of the apparatus illustrated in FIG. 1.

Hereinbelow, an operation of the apparatus in accordance with the first embodiment is detailed with reference to FIG. 4, which is a flow chart showing the operation of the apparatus.

When a user approaches the cash processing machine 1, the sensor 4 detects the user approaching the cash processing machine 1, in step S1. The sensor 4 is set to be able to detect a user who approaches the cash processing machine 1, without fail. The sensor 4 measures a distance between itself and the user to thereby recognize a user approaching the cash processing machine 1.

Then, the cash processing machine 1 is put into a stand-by mode where the cash processing machine 1 waits for the user's actuation, in step S2.

After confirming in step S3 that the user has operated the manipulation board 7, the controller 50 confirms a portion of the user to be photographed, based on a detection signal transmitted from the sensor 4 in step S4. Initially, the sensor 4 is almost horizontally directed in order to detect a user without fail. For instance, the sensor 4 is set to be directed toward a waist of a user. Since the built-in camera 2 is directed slightly downwardly by a predetermined angle relative to the sensor 4, if a picture is taken at that time, a portion situated below a waist of a user would be photographed. If the detection signal transmitted from the sensor 4 does not vary so much when the sensor 4 together with the built-in camera 2 is rotated in a counterclockwise direction, it means that the sensor 4 is detecting a portion of the user.

The, the controller 50 drives the mover 3 to thereby rotate the built-in camera 2 and the sensor 4 fixed to the built-in camera in a counterclockwise direction in step S5. The built-in camera 2 is rotated continuously in a counterclockwise direction until the sensor 4 can no longer detect the user. In the first embodiment, a field of view of the built-in camera 2 moves upwardly from a waist of a user, as the built-in camera 2 and the sensor 4 are rotated in a counterclockwise direction.

As described above, the third program 8 monitors whether the detection signal transmitted from the sensor 4 varies or not on the basis of the signals transmitted from the first program 5, while controlling the mover 3 to thereby rotate the built-in camera 2 in a counterclockwise direction. When the detection signal transmitted from the sensor 4 is found to vary in step S6, the sensor 4 is directed so upwardly that the sensor 4 can no longer detect the user. Since the built-in camera 2 is slightly downwardly inclined relative to the sensor 4, the built-in camera 2 catches a face of the user to be photographed almost exactly in a field of view thereof.

At this point, the third program 8 stops rotation of the built-in camera 2 in step S7, and causes the built-in camera 2 to take a photograph of a face of the user in step S8.

Thereafter, a decision is made as to whether control of the built-in camera 2 should be finished in step S9. If control of the built-in camera 2 is not to be finished, the operation returns back to step S4. Then, the detection signal transmitted from the sensor 4 is checked with the built-in camera 3 together with the sensor 4 being rotated in a clockwise direction, in step S5.

If the detection signal transmitted from the sensor 4 is varied, the built-in camera 2 is further rotated to a point beyond which the sensor cannot detect the user.

By repeating these steps, it is possible to catch a face of the user nearly at the center of a field of view of the built-in camera 2.

Second Embodiment

Figure 5A:
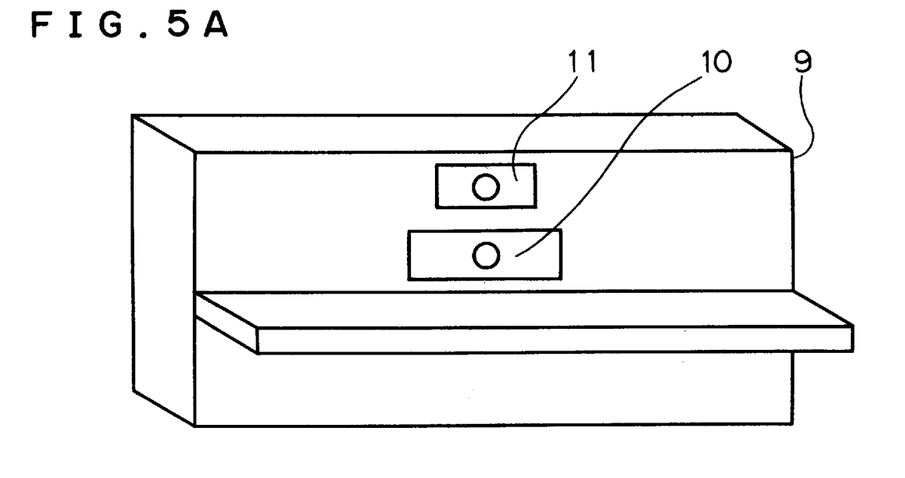
FIGS. 5A is a perspective view illustrating an apparatus in accordance with the second embodiment of the present invention.
Figure 5B:
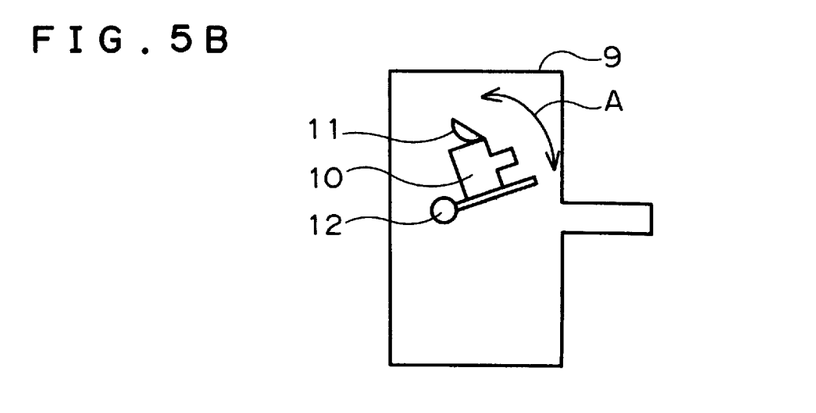
FIG. 5B is a cross-sectional view taken along the line 5B—5B in FIG. 5A.
Figure 5C:
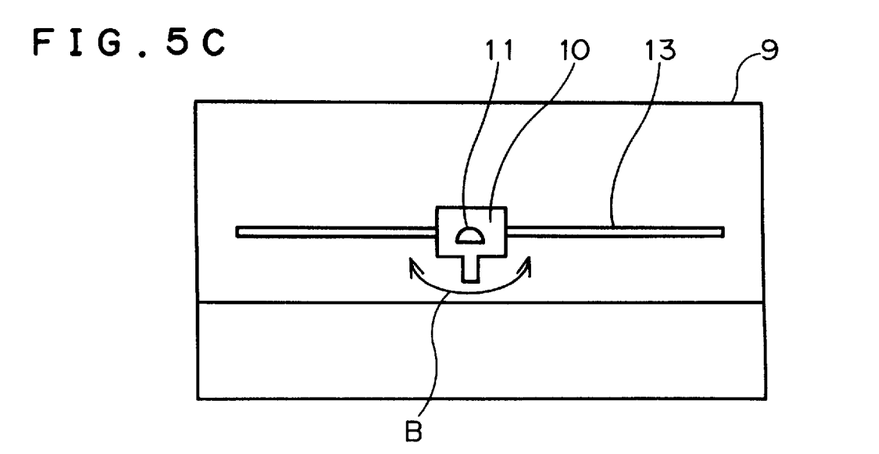
FIG. 5C is a cross-sectional view taken along the line 5C—5C in FIG. 5A.

FIGS. 5A to 5C illustrate an apparatus of controlling a position of a built-in camera installed in a cash processing machine for taking a photograph of a desired portion of an object to be photographed, in accordance with the second embodiment. In the second embodiment, the apparatus is applied to an automatic guide reception unit 9.

The apparatus in accordance with the second embodiment is comprised of a built-in camera 10, a sensor 11 mounted on the built-in camera 11 and having a sensor axis upwardly inclined by a predetermined angle relative to an optical axis of the built-in camera 2, and a mover 12 for rotating both the built-in camera 10 and the sensor 11 together in vertical and horizontal planes.

As illustrated in FIG. 5A, the automatic guide reception unit 9 is horizontally long. Hence, the built-in camera 10 in the second embodiment is designed to rotate not only in a vertical plane, but also in a horizontal plane. Specifically, the built-in camera 10 is designed to rotate in a direction indicated with an arrow A in FIG. 5B, and further in a direction indicated with an arrow B in FIG. 5C. Since the built-in camera 10 can rotate in a horizontal plane, namely, in a direction indicated with the arrow B, the built-in camera 10 can take a photograph of a side face of a user.

Since the sensor 11 is fixed onto the camera 10, the sensor 11 can also rotate in both the directions indicated with the arrows A and B.

The apparatus in accordance with the second embodiment is comprised further of a guide rail 13 extending in the automatic guide reception unit 9 along a length of the automatic guide reception unit 9, and a driver (not illustrated) for moving the built-in camera 10, the sensor 11, and the mover 12 along the guide rail 13. The driver is controlled by the controller 50 illustrated in FIG. 3.

The controller 50 receives the detection signal from the sensor 11, indicative of a location of a user. The controller 50 controls the mover 12 to thereby rotate the built-in camera 10 and the sensor 11 together in a direction indicated with the arrow A and/or in a direction indicated with the arrow B, and further controls the driver to thereby move the built-in camera 10 and the sensor 11 together along the guide rail 13.

In accordance with the second embodiment, the built-in camera 10 is always kept directed at the user, and hence, can take photographs of a front face and a side face of a user.

Third Embodiment

Figure 6A:
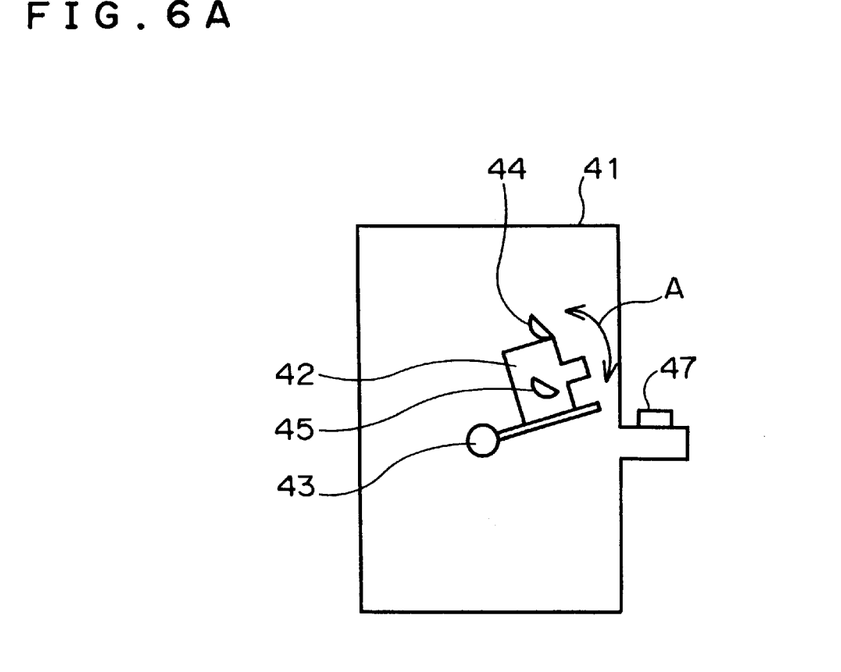
FIG. 6A is a cross-sectional view of an apparatus in accordance with the third embodiment of the present invention.
Figure 6B:
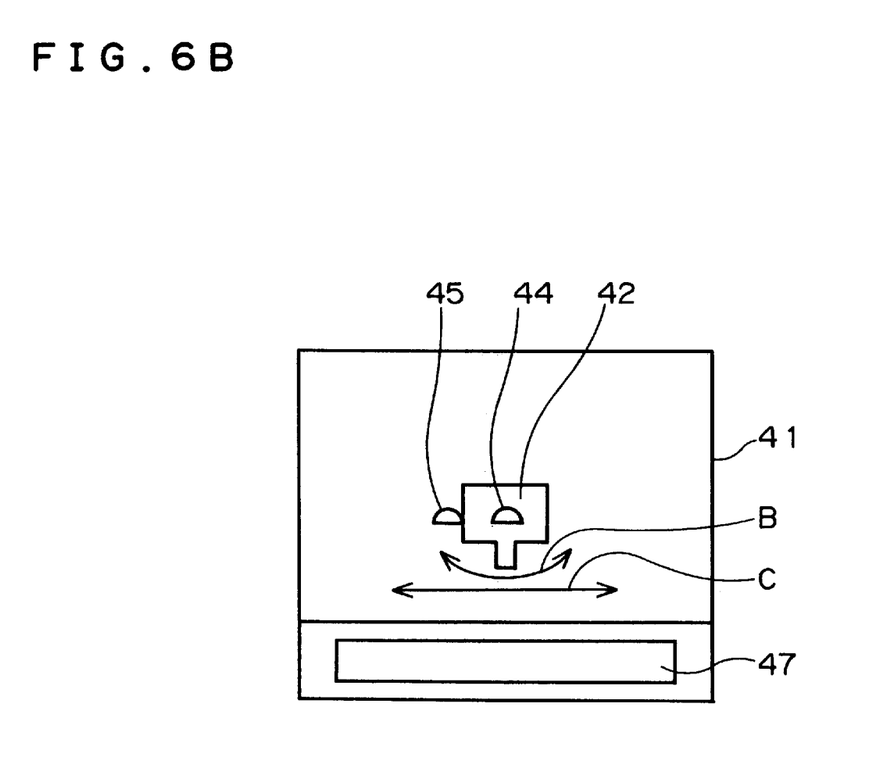
FIG. 6B is a top view of the apparatus in accordance with the third embodiment of the present invention.

FIGS. 6A and 6B illustrate an apparatus of controlling a position of a built-in camera installed in a cash processing machine for taking a photograph of a desired portion of an object to be photographed, in accordance with the third embodiment. In the third embodiment, the apparatus is applied to a cash dispenser 41 including a manipulation board 47 at a front thereof.

The apparatus in accordance with the third embodiment is comprised of a built-in camera 42, a first sensor 44 mounted on the built-in camera 42 and having a first sensor axis upwardly inclined by a predetermined angle relative to an optical axis of the built-in camera 42, a second sensor 45 attached to a sidewall of the built-in camera 42 and having a second sensor axis upwardly inclined by a predetermined angle relative to an optical axis of the built-in camera 42, and a mover 43 for rotating both the built-in camera 42, the first sensor 44, and the second sensor 45 together in vertical and horizontal planes.

The built-in camera 42 in the third embodiment is designed to rotate not only in a vertical plane, but also in a horizontal plane, similarly to the built-in camera 10 in the second embodiment. Specifically, the built-in camera 42 is designed to rotate in a direction indicated with an arrow A in FIG. 6A, and further in a direction indicated with an arrow B in FIG. 6B.

The first and second sensors 44 and 45 are fixed onto the camera 42, the first and second sensors 44 and 45 can also rotate in both the directions indicated with the arrows A and B.

In accordance with the third embodiment, the built-in camera 42 can take photographs of two portions of a user. For instance, when the first sensor 44 detects a top of a head of a user, the built-in camera 42 may be designed to take a photograph of a front face of the user, and when the second sensor 45 detects an arm of a user, the built-in camera 42 may be designed to take a photograph of a hand of the user. In addition, the built-in camera 42 can take a photograph of a side face of the user by rotating in a direction indicated with the arrow B.

The apparatus in accordance with the third embodiment may be comprised further of a guide rail extending in the cash dispenser 1 along a width of the cash dispenser 1 so that the built-in camera 42, the first sensor 44, and the second sensor 45 can move in a width-wise direction of the cash dispenser, that is, in a direction indicated with an arrow C, similarly to the second embodiment.

Hereinbelow is explained an embodiment of a recording medium storing a program therein for accomplishing the above-mentioned apparatus of controlling a position of a built-in camera installed in an equipment for taking a photograph of a desired portion of an object to be photographed.

A recording medium storing a program for accomplishing the abovementioned apparatus may be made by programming functions of the abovementioned apparatus with a programming language readable by a computer, and further by recording the program in a recording medium such as CD-ROM, a floppy disc, a magnetic tape, and any other suitable means for storing a program therein.

A hard disc equipped in a server may be employed as a recording medium. It is also possible to accomplish the recording medium in accordance with the present invention by storing the above-mentioned computer program in a recording medium as mentioned above, and reading that computer program by other computers through a network.

As having been described with reference to the preferred embodiments, the present invention has advantages as follows.

First, since a built-in camera and a sensor are moved together, and detection of a location of an object to be photographed and rotation of a built-in camera are concurrently carried out, an object to be photographed can be photographed accurately under simple control.

Secondly, as a built-in camera and a sensor are moved together, they can be controlled by a single sensor. As a result, it is possible to detect a location of an object to be photographed and take a photograph of the object with less number of components.

Thirdly, since a built-in camera can accurately take a photograph of an object, it is no longer necessary to use a wide angle lens or a high-performance built-in camera. Hence, an apparatus of controlling a position of a built-in camera installed in an equipment for taking a photograph of a desired portion of an object to be photographed can be fabricated in a smaller size and a smaller weight. As a result, security and reliability of the apparatus is enhanced, because a clearer image can be obtained in a photograph.

It is also no longer necessary to operate a camera under remote control, resulting in enhancement of operability. Furthermore, as the sensor and the built-in camera are moved together, the apparatus may be fabricated in a simpler structure. In addition, since the apparatus processes less amount of data than that of a conventional apparatus, the apparatus can operate more rapidly.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-313343 filed on Nov. 14, 1997 including specification, claims, drawings and summary is incorporated herein by reference in its entirety.

What is claimed is:

1. A method of controlling a position of a built-in camera installed in an equipment for taking a photograph of a desired portion of an object to be photographed, comprising the steps of:

(a) preparing a sensor having a sensor axis along which said sensor has maximum sensitivity, said sensor transmitting a detection signal when it detects the object to be photographed;

(b) defining, when said detection signal varies by a predetermined value or greater, a certain portion of said object situated along the sensor axis as a particular portion of said object;

(c) determining in advance the desired portion of said object to be photographed, on the basis of said particular portion of said object;

(d) fixing an optical axis of said built-in camera relative to said sensor axis in such a manner that said optical axis of said built-in camera is directed toward said desired portion of said object when said sensor axis is directed toward said particular portion of said object; and (e) changing an orientation of said sensor axis toward said particular portion of said object, and causing said built-in camera to take a photograph of said object when said detection signal indicates that said sensor axis is directed toward said particular portion of said object.

2. The method as set forth in claim 1, wherein an orientation of said sensor axis is changed toward said particular portion of said object in said step (e) after it has been detected that said object was situated at a predetermined location.

3. The method as set forth in claim 1, wherein said particular portion of said object is an end of said object.

4. The method as set forth in claim 1, wherein said particular portion of said object is a top of a head of said object, and said desired portion of said object is a face of said object.

5. The method as set forth in claim 1, wherein said equipment is a cash processing machine.

6. The method as set forth in claim 1, wherein said sensor is integral with said built-in camera as a one-piece unit in such a manner that said sensor is inclined relative to said built-in camera by a predetermined degree.

7. The method as set forth in claim 6, wherein said sensor is mounted on said built-in camera.

8. The method as set forth in claim 6, wherein said optical axis of said built-in camera is downwardly directed relative to said sensor.

9. The method as set forth in claim 1, wherein said sensor and said built-in camera are directed from downward to upward.

10. A method of controlling a position of a built-in camera installed in an equipment for taking a photograph of a desired portion of an object to be photographed, comprising the steps of:
(a) preparing a sensor having a sensor axis along which said sensor has maximum sensitivity, said sensor transmitting a detection signal when it detects the object to be photographed;
(b) defining, when said detection signal varies by a predetermined value or greater, a certain portion of said object situated along the sensor axis as a particular portion of said object;
(c) determining in advance the desired portion of said object to be photographed, on the basis of said particular portion of said object;
(d) fixing an optical axis of said built-in camera relative to said sensor axis in such a manner that said optical axis of said built-in camera in directed toward said desired portion of said object when said sensor axis is directed toward said particular portion of said object; and
(e) changing an orientation of said sensor axis toward said particular portion of said object in both vertical and horizontal planes, and causing said built-in camera to take a photograph of said object when said detection signal indicates that said sensor axis is directed toward said particular portion of said object.

11. The method as set forth in claim 10, wherein an orientation of said sensor axis is changed toward said particular portion of said object in said step (e) after it has been detected that said object was situated at a predetermined location.

12. The method as set forth in claim 10, wherein said particular portion of said object is an end of said object.

13. The method as set forth in claim 10, wherein said particular portion of said object is a top of a head of said object, and said desired portion of said object is a face of said object.

14. The method as set forth in claim 10, wherein said equipment is a cash processing machine.

15. The method as set forth in claim 10, wherein said sensor is integral with said built-in camera as a one-piece unit in such a manner that said sensor is inclined relative to said built-in camera by a predetermined degree.

16. The method as set forth in claim 15, wherein said sensor is mounted on said built-in camera.

17. The method as set forth in claim 15, wherein said optical axis of said built-in camera is downwardly directed relative to said sensor.

18. The method as set forth in claim 10, wherein said sensor and said built-in camera are directed from downward to upward.

19. A method of controlling a position of a built-in camera installed in an equipment for taking a photograph of a desired portion of an object to be photographed, comprising the steps of:
(a) detecting that said object is approaching the equipment, by means of a sensor;
(b) identifying parts of said object on the basis of output signals transmitted from said sensor;
(c) upwardly directing both said sensor and said built-in camera until said sensor fails to detect said object;
(d) stopping both said sensor and said built-in camera when the output signals of said sensor vary; and
(e) taking a photograph of said object.

20. The method as set forth in claim 19, wherein said built-in camera is initially, horizontally directed.

21. The method as set forth in claim 19, wherein a photograph taken in said step (e) is of a face of said object.

22. The method as set forth in claim 19, further comprising the steps of:
(f) downwardly directing both said sensor and said built-in camera until the output signals of said sensor vary; and
(g) taking a photograph of said object.

23. The method as set forth in claim 22, further comprising the step of repeating the steps (c) to (g).

24. The method as set forth in claim 19, wherein said equipment is a cash processing machine.

25. The method as set forth in claim 19, wherein said sensor is integral with said built-in camera as a one-piece unit in such a manner that said sensor is inclined relative to said built-in camera by a predetermined degree.

26. The method as set forth in claim 25, wherein said sensor is mounted on said built-in camera.

27. The method as set forth in claim 25, wherein said optical axis of said built-in camera is downwardly directed relative to said sensor.

28. An apparatus of controlling a position of a built-in camera installed in an equipment for taking a photograph of a desired portion of an object to be photographed, comprising:
(a) a sensor having a sensor axis along which it has maximum sensitivity, said sensor transmitting a detection signal when it detects the object to be photographed;
(b) a built-in camera for taking the photograph of the desired portion of said object, said desired portion being defined relative to a particular portion of said object where said detection signal varies by a predetermined value or greater, said built-in camera having an optical axis fixed relative to said sensor axis in such a manner that said optical axis of said built-in camera is directed toward said desired portion of said object when said sensor axis is directed toward said particular portion of said object;

(c) a mover for moving both said sensor and said built-in camera; and (d) a controller for controlling said mover to cause an orientation of said sensor axis to be directed toward said particular portion of said object, and for causing said built-in camera to take a photograph when said detection signal indicates that said sensor axis is directed toward said particular portion of said object.

29. The apparatus as set forth in claim 28, wherein said controller includes:

(a) a first detector for computing said detection signal transmitted from said sensor to thereby detect a location of said object;

(b) a mode selector for putting said apparatus into a stand-by mode when said object reaches a predetermined location;

(c) a second detector for detecting whether said object starts manipulating said apparatus; and (d) a built-in camera controller for driving said mover so that said sensor axis is directed toward said particular portion of said object, when said second detector detects that said object starts manipulating said apparatus, and causing said built-in camera to take a photograph when said sensor axis is directed toward said particular portion of said object.

30. The apparatus as set forth in claim 28, wherein said particular portion of said object is an end of said object.

31. The apparatus as set forth in claim 28, wherein said particular portion of said object is a top of a head of said object, and said desired portion of said object is a face of said object.

32. The apparatus as set forth in claim 28, wherein said equipment is a cash processing machine.

33. The apparatus as set forth in claim 28, wherein said sensor is integral with said built-in camera as a one-piece unit in such a manner that said sensor is inclined relative to said built-in camera by a predetermined degree.

34. The apparatus as set forth in claim 33, wherein said sensor is mounted on said built-in camera.

35. The apparatus as set forth in claim 33, wherein an optical axis of said built-in camera is downwardly directed relative to said sensor.

36. The apparatus as set forth in claim 28, wherein said apparatus has a length in a horizontal direction, and further comprising a mover for moving both said sensor and said built-in camera along said length of said apparatus.

37. An apparatus of controlling a position of a built-in camera installed in an equipment for taking a photograph of a desired portion of an object to be photographed, comprising:

(a) a first sensor having a first sensor axis along which it has maximum sensitivity, said first sensor transmitting a first detection signal when it detects the object to be photographed;

(b) a second sensor having a second sensor axis along which it has maximum sensitivity, said second sensor transmitting a second detection signal when it detects the object to be photographed;

(c) a built-in camera for taking photographs of first and second desired portions of said object, said first and second desired portions being defined relative to first and second particular portions of said object which are defined as portions of said object situated in orientations of said first and second sensor axes at which said first and second detection signals vary by a predetermined value or greater, said built-in camera having an optical axis fixed relative to said first and second sensor axes in such a manner that said optical axis of said built-in camera is directed toward said first and second desired portions of said object, respectively;

(d) a mover for rotating said sensors and said built-in camera in a first plane including therein both said optical axis of said built-in camera and said first sensor axis, or in a second plane including therein both said optical axis of said built-in camera and said second sensor axis; and (e) a controller for controlling said mover to cause orientations of said first and second sensor axes to be directed toward said first and second particular portions of said object, and for causing said built-in camera to take photographs when said first and second detection signals indicate that said first and second sensor axes are directed toward said first and second particular portions of said object.

38. The apparatus as set forth in claim 37, wherein said controller includes:

(a) a first detector for computing said first and second detection signals transmitted from said first and second sensors to thereby detect a location of said object;

(b) a mode selector for putting said apparatus into a stand-by mode when said object reaches a predetermined location;

(c) a second detector for detecting whether said object starts manipulating said apparatus; and (d) a built-in camera controller for driving said mover so that said first and second sensor axes are directed toward said first and second particular portions of said object, when said second detector detects that said object starts manipulating said apparatus, and causing said built-in camera to take photographs when said first and second sensor axes are directed toward said first and second particular portions of said object.

39. The apparatus as set forth in claim 37, wherein said first and second particular portions of said object are ends of said object.

40. The apparatus as set forth in claim 37, wherein said first and second particular portions of said object are a top of a head of said object, said first desired portion of said object is a front face of said object, and said second desired portion of said object is a side face of said object.

41. The apparatus as set forth in claim 37, wherein said equipment is a cash processing machine.

42. The apparatus as set forth in claim 37, wherein said first and second sensors are integral with said built-in camera as a one-piece unit in such a manner that said first and second sensors are inclined relative to said built-in camera by a predetermined degree.

43. The apparatus as set forth in claim 42, wherein said first and second sensors are mounted on said built-in camera.

44. The apparatus as set forth in claim 42, wherein an optical axis of said built-in camera is downwardly directed relative to said first and second sensors.

45. The apparatus as set forth in claim 37, wherein said first and second planes are perpendicular with each other.

46. The apparatus as set forth in claim 45, wherein said first plane is a vertical plane, and said second plane is a horizontal plane.

47. The apparatus as set forth in claim 37, wherein said apparatus has a length in a horizontal direction, and further comprising a mover for moving both said first and second sensors and said built-in camera along said length of said apparatus.

48. An apparatus of controlling a position of a built-in camera installed in an equipment for taking a photograph of a desired portion of an object to be photographed, comprising:

(a) N sensors each having a sensor axis along which it has maximum sensitivity and transmitting a detection signal when it detects the object to be photographed, said N being an integer equal to or greater than 3;

(b) a built-in camera for taking photographs of N desired portions of said object, said N desired portions being defined relative to N particular portions of said object which are defined as portions of said object situated in orientations of sensor axes of said N sensors at which said detection signal varies by a predetermined value or greater, said built-in camera having an optical axis fixed relative to said sensor axes in such a manner that said optical axis of said built-in camera is directed toward said N desired portions of said object when said sensor axes are directed toward said N particular portions of said object, respectively;

(c) a mover for rotating said sensors and said built-in camera in N planes each including therein both said optical axis of said built-in camera and a sensor axis of one of said N sensors; and (d) a controller for controlling said mover to cause orientations of said sensor axes to be directed toward said N particular portions of said object, and for causing said built-in camera to take photographs when said detection signal indicates that said sensor axes are directed toward said N particular portions of said object.

49. The apparatus as set forth in claim 48, wherein said controller includes:

(a) a first detector for computing said detection signal transmitted from said N sensors to thereby detect a location of said object;

(b) a mode selector for putting said apparatus into a stand-by mode when said object reaches a predetermined location;

(c) a second detector for detecting whether said object starts manipulating said apparatus;

(d) a built-in camera controller for driving said mover so that said sensor axes are directed toward said N particular portions of said object, when said second detector detects that said object starts manipulating said apparatus, and causing said built-in camera to take photographs when said sensor axes are directed toward said N particular portions of said object.

50. The apparatus as set forth in claim 48, wherein said N particular portions of said object are ends of said object.

51. The apparatus as set forth in claim 48, wherein at least one of said N particular portions of said object is a top of a head of said object, at least one of said N desired portions of said object is a front face of said object, and at least one of said N desired portions of said object is a side face of said object.

52. The apparatus as set forth in claim 48, wherein said equipment is a cash processing machine.

53. The apparatus as set forth in claim 48, wherein said N sensors are integral with said built-in camera as a one-piece unit in such a manner that at least one of said N sensors is inclined relative to said built-in camera by a predetermined degree.

54. The apparatus as set forth in claim 53, wherein said N sensors are mounted on said built-in camera.

55. The apparatus as set forth in claim 53, wherein an optical axis of said built-in camera is downwardly directed relative to said N sensors.

56. The apparatus as set forth in claim 48, wherein said N planes include planes perpendicular with each other.

57. The apparatus as set forth in claim 56, wherein said N planes includes at least one vertical plane and at least one horizontal plane.

58. The apparatus as set forth in claim 48, wherein said apparatus has a length in a horizontal direction, and further comprising a mover for moving both said N sensors and said built-in camera along said length of said apparatus.

59. A recording medium readable by a computer, storing a program therein for causing a computer to operate an apparatus of controlling a position of a built-in camera installed in an equipment for taking a photograph of a desired portion of an object to be photographed, said apparatus comprising:

(a) a sensor having a sensor axis along which it has maximum sensitivity, said sensor transmitting a detection signal when it detects the object to be photographed;

(b) a built-in camera for taking a photograph of a desired portion of said object, said desired portion being defined relative to a particular portion of said object which is defined as a portion of said object situated in an orientation of said sensor axis at which said detection signal varies by a predetermined value or greater, said built-in camera having an optical axis fixed relative to said sensor axis in such a manner that said optical axis of said built-in camera is directed toward said desired portion of said object when said sensor axis is directed toward said particular portion of said object; and (c) a mover for moving both said sensor and said built-in camera, said program causing said apparatus to (a) compute said detection signal transmitted from said sensor to thereby detect a location of said object, (b) put said apparatus into a stand-by mode when said object reaches a predetermined location, (c) detect whether said object starts manipulating said apparatus, and (d) drive said mover so that said sensor axis is directed toward said particular portion of said object, when said second detector detects that said object starts manipulating said apparatus, and cause said built-in camera to take a photograph when said sensor axis is directed toward said particular portion of said object.

60. The recording medium as set forth in claim 59, wherein said equipment is a cash processing machine.

61. The recording medium as set forth in claim 59, wherein said apparatus has a length in a horizontal direction, and further comprising a mover for moving both said sensor and said built-in camera along said length of said apparatus, said program causing said apparatus to move both said sensor and said built-in camera along said length of said apparatus so that said built-in camera faces said object.

62. A recording medium readable by a computer, storing a program therein for causing a computer to operate an apparatus of controlling a position of a built-in camera installed in an equipment for taking a photograph of a desired portion of an object to be photographed, said apparatus comprising:

(a) a first sensor having a first sensor axis along which it has maximum sensitivity, said first sensor transmitting a first detection signal when it detects the object to be photographed;

(b) a second sensor having a second sensor axis along which it has maximum sensitivity, said second sensor transmitting a second detection signal when it detects the object to be photographed;

(c) a built-in camera for taking photographs of first and second desired portions of said object, said first and second desired portions being defined relative to first and second particular portions of said object which are defined as portions of said object situated in orientations of said first and second sensor axes at which said first and second detection signals vary by a predetermined value or greater, said built-in camera having an optical axis fixed relative to said first and second sensor axes in such a manner that said optical axis of said built-in camera is directed toward said first and second desired portions of said object, respectively (d) a mover for rotating said sensors and said built-in camera in a first plane including therein both said optical axis of said built-in camera and said first sensor axis, or in a second plane including therein both said optical axis of said built-in camera and said second sensor axis; and said program causing said apparatus to (a) compute said first and second detection signals transmitted from said first and second sensors to thereby detect a location of said object, (b) put said apparatus into a stand-by mode when said object reaches a predetermined location, (c) detect whether said object starts manipulating said apparatus, and (d) drive said mover so that said first and second sensor axes are directed toward said first and second particular portions of said object, when said second detector detects that said object starts manipulating said apparatus, and cause said built-in camera to take photographs when said first and second sensor axes are directed toward said first and second particular portions of said object.

63. The recording medium as set forth in claim 62, wherein said equipment is a cash processing machine.

64. The recording medium as set forth in claim 62, wherein said first and second planes are perpendicular with each other.

65. The recording medium as set forth in claim 64, wherein said first plane is a vertical plane, and said second plane is a horizontal plane.

66. The recording medium as set forth in claim 62, wherein said apparatus has a length in a horizontal direction, and further comprising a mover for moving both said sensor and said built-in camera along said length of said apparatus, said program causing said apparatus to move both said sensor and said built-in camera along said length of said apparatus so that said built-in camera faces said object.

67. A recording medium readable by a computer, storing a program therein for causing a computer to operate an apparatus of controlling a position of a built-in camera installed in an equipment for taking a photograph of a desired portion of an object to be photographed, said apparatus comprising:

(a) N sensors each having a sensor axis along which it has maximum sensitivity and transmitting a detection signal when it detects the object to be photographed, said N being an integer equal to or greater than 3;

(b) a built-in camera for taking photographs of N desired portions of said object, said N desired portions being defined relative to N particular portions of said object which are defined as portions of said object situated in orientations of sensor axes of said N sensors at which said detection signal varies by a predetermined value or greater, said built-in camera having an optical axis fixed relative to said sensor axes in such a manner that said optical axis of said built-in camera is directed toward said N desired portions of said object when said sensor axes are directed toward said N particular portions of said object, respectively;

(c) a mover for rotating said sensors and said built-in camera in N planes each including therein both said optical axis of said built-in camera and a sensor axis of one of said N sensors; and said program causing said apparatus to (a) compute said detection signal transmitted from said N sensors to thereby detect a location of said object, (b) put said apparatus into a stand-by mode when said object reaches a predetermined location, (c) detect whether said object starts manipulating said apparatus, and (d) drive said mover so that said sensor axes are directed toward said N particular portions of said object, when said second detector detects that said object starts manipulating said apparatus, and causing said built-in camera to take photographs when said sensor axes are directed toward said N particular portions of said object.

68. The recording medium as set forth in claim 67, wherein said equipment is a cash processing machine.

69. The recording medium as set forth in claim 67, wherein said N planes include planes perpendicular with each other.

70. The recording medium as set forth in claim 69, wherein said N planes includes at least one vertical plane and at least one horizontal plane.

71. The recording medium as set forth in claim 67, wherein said apparatus has a length in a horizontal direction, and further comprising a mover for moving both said sensor and said built-in camera along said length of said apparatus, said program causing said apparatus to move both said sensor and said built-in camera along said length of said apparatus so that said built-in camera faces said object.

* * * * *